US012215400B2

(12) United States Patent
Hong et al.

(10) Patent No.: US 12,215,400 B2
(45) **Date of Patent: *Feb. 4, 2025**

(54) NON-DIRECTIONAL ELECTRICAL STEEL SHEET AND METHOD FOR PRODUCING SAME

(71) Applicant: POSCO, Pohang-si (KR)

(72) Inventors: Jaewan Hong, Pohang-si (KR); June Soo Park, Pohang-si (KR); Su-Yong Shin, Pohang-si (KR); Yong-Soo Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 729 days.

This patent is subject to a terminal disclaimer.

(21) Appl. No.: 17/297,731

(22) PCT Filed: Nov. 26, 2019

(86) PCT No.: PCT/KR2019/016380

§ 371 (c)(1),
(2) Date: May 27, 2021

(87) PCT Pub. No.: WO2020/111736

PCT Pub. Date: Jun. 4, 2020

(65) Prior Publication Data

US 2022/0049322 A1 Feb. 17, 2022

(30) Foreign Application Priority Data

Nov. 30, 2018 (KR) ........................ 10-2018-0152977

(51) Int. Cl.

| | |
|---|---|
| ***C21D 9/46*** | (2006.01) |
| ***C21D 6/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/14*** | (2006.01) |
| ***H01F 1/147*** | (2006.01) |

(52) U.S. Cl.

CPC ............... *C21D 9/46* (2013.01); *C21D 6/005* (2013.01); *C21D 6/008* (2013.01); *C21D 8/1222* (2013.01); *C21D 8/1233* (2013.01); *C21D 8/1272* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *H01F 1/14766* (2013.01); *C22C 2202/02* (2013.01)

(58) Field of Classification Search

None

See application file for complete search history.

(56) References Cited

U.S. PATENT DOCUMENTS

| | | | | |
|---|---|---|---|---|
| 2009/0202383 | A1 * | 8/2009 | Tanaka .................. | C22C 38/004 148/624 |
| 2015/0348686 | A1 | 12/2015 | Toda et al. | |
| 2016/0076125 | A1 | 3/2016 | Koseki et al. | |
| 2017/0241002 | A1 | 8/2017 | Nakajima et al. | |
| 2018/0230564 | A1 | 8/2018 | Nakajima et al. | |
| 2020/0080175 | A1 * | 3/2020 | Kim ...................... | C22C 38/004 |

FOREIGN PATENT DOCUMENTS

| | | | |
|---|---|---|---|
| CN | 101218362 | A | 7/2008 |
| JP | 2003-166019 | A | 6/2003 |
| JP | 2007-031793 | A | 2/2007 |
| JP | 2011-190485 | A | 9/2011 |
| JP | 5533958 | B2 | 6/2014 |
| JP | 2014-185365 | A | 10/2014 |
| JP | 6236470 | B2 | 11/2017 |
| JP | 2018-504516 | A | 2/2018 |
| KR | 10-2008-0027913 | A | 3/2008 |
| KR | 10-2016-0061797 | A | 6/2016 |
| KR | 10-1705235 | B1 | 2/2017 |
| KR | 10-1728827 | B1 | 4/2017 |
| KR | 10-2018-0070949 | A | 6/2018 |
| KR | 10-2018-0071104 | A | 6/2018 |
| KR | 10-2018-0071640 | A | 6/2018 |
| KR | 10-1898368 | B1 | 9/2018 |
| KR | 10-2020-0065995 | A | 6/2020 |
| WO | 2010/0140509 | A1 | 11/2012 |
| WO | 2016/002904 | A1 | 4/2017 |
| WO | 2016/027565 | A1 | 4/2017 |
| WO | 2017/022360 | A1 | 8/2017 |
| WO | 2018/117598 | A1 | 6/2018 |
| WO | 2018/117600 | A1 | 6/2018 |
| WO | 2018/117602 | A1 | 6/2018 |

OTHER PUBLICATIONS

Extended European Search Report dated Jul. 28, 2021 issued in European Patent Application No. 19890083.9.
International Search Report issued in corresponding International Patent Application No. PCT/KR2019/016380 dated Jun. 22, 2020.
Chinese Office Action dated Apr. 22, 2022 issued in Chinese Patent Application No. 201980078877.3.
Japanese Office Action dated Feb. 7, 2023 issued in Japanese Patent Application No. 2021-531072.

* cited by examiner

*Primary Examiner* — Anthony M Liang
(74) *Attorney, Agent, or Firm* — Morgan, Lewis & Bockius LLP

(57) ABSTRACT

A non-oriented electrical steel sheet according to an embodiment of the present invention includes, in wt %, Si at 0.2 to 4.3%, Mn at 0.05 to 2.5%, Al at 0.1 to 2.1%, Bi at 0.0001 to 0.003%, Ga at 0.0001 to 0.003%, and the balance of Fe and inevitable impurities.

6 Claims, No Drawings

NON-DIRECTIONAL ELECTRICAL STEEL SHEET AND METHOD FOR PRODUCING SAME

CROSS-REFERENCE OF RELATED APPLICATIONS

This application is the U.S. National Phase under 35 U.S.C. § 371 of International Patent Application No. PCT/KR2019/016380, filed on Nov. 26, 2019, which in turn claims the benefit of Korean Application No. 10-2018-0152977, filed on Nov. 30, 2018, the entire disclosures of which applications are incorporated by reference herein.

TECHNICAL FIELD

The present invention relates to a non-oriented electrical steel sheet and a manufacturing method thereof. More specifically, the present invention relates to a non-oriented electrical steel sheet and a manufacturing method thereof that minimizes stress remaining in a steel sheet during processing of a non-oriented electrical steel sheet to prevent deterioration of iron loss.

BACKGROUND ART

A non-oriented electrical steel sheet has uniform magnetic properties in all orientations, so it is generally used as a material for a motor core, a generator iron core, a motor, and a small transformer. Typical magnetic properties of the non-oriented electrical steel are iron loss and magnetic flux density, and the lower the iron loss of the non-oriented electrical steel sheet, the less iron is lost in a process of magnetizing an iron core, thereby improving efficiency, and since the higher the magnetic flux density, the greater a magnetic field may be induced with the same energy, and since less current may be applied to obtain the same magnetic flux density, energy efficiency may be improved by reducing copper loss. In processes of manufacturing a motor core, an iron core of a generator, an electric motor, and a small transformer with the non-oriented electrical steel sheet, a processing process such as punching is performed. During the processing process, stress is generated in the steel sheet, which still remains after the processing. The stress remaining in the steel sheet causes deformation of a magnetic domain structure in a process of magnetization of the iron core, so that it is disadvantageous to movement of the magnetic domain, thus the iron loss is deteriorated. Therefore, the non-oriented electrical steel sheet is subjected to stress relief annealing (SRA) to improve magnetic properties after processing such as punching. However, when cost due to heat treatment is larger than a magnetic property effect due to the stress relief annealing, the stress relief annealing may be omitted. In this case, since residual stress after processing is not removed, iron loss may be deteriorated.

DISCLOSURE

Description of the Drawings

A non-oriented electrical steel sheet and a manufacturing method thereof are provided. More specifically, a non-oriented electrical steel sheet and a manufacturing method thereof that minimizes stress remaining in a steel sheet during processing of a non-oriented electrical steel sheet to prevent deterioration of iron loss are provided.

A non-oriented electrical steel sheet according to an embodiment of the present invention includes, in wt %, Si at 0.2 to 4.3%, Mn at 0.05 to 2.5%, Al at 0.1 to 2.1%, Bi at 0.0001 to 0.003%, Ga at 0.0001 to 0.003%, and the balance of Fe and inevitable impurities.

The non-oriented electrical steel sheet may satisfy Formula 1 below.

$$[\text{Iron loss}(W_{15/50})\text{after shearing processing}]-[\text{Iron loss}(W_{15/50})\text{after discharge processing}]\leq 0.05(\text{W/kg}) \quad \text{[Formula 1]}$$

One or more of C, S, N, and Ti may be further included in an amount of 0.005 wt % or less, respectively.

One or more of P, Sn, and Sb may be further included in an amount of 0.2 wt % or less, respectively.

One or more of Cu, Ni, and Cr may be further contained in an amount of 0.05 wt % or less, respectively.

One or more of Zr, Mo, and V may be further contained in an amount of 0.01 wt % or less, respectively.

The non-oriented electrical steel sheet may satisfy Formula 2 below.

$$0.002\leq[\text{Bi}]+[\text{Ga}]\leq 0.005 \quad \text{[Formula 2]}$$

(In Formula 2, [Bi] and [Ga] represent contents (wt %) of Bi and Ga, respectively.)

Another embodiment of the present invention provides a manufacturing method of a non-oriented electrical steel sheet, including: heating a slab including, in wt %, Si at 0.2 to 4.3%, Mn at 0.05 to 2.5%, Al at 0.1 to 2.1%, Bi at 0.0001 to 0.003%, Ga at 0.0001 to 0.003%, and the balance of Fe and inevitable impurities; hot-rolling the slab to manufacture a hot rolled sheet; cold-rolling the hot-rolled sheet to manufacture a cold-rolled sheet; and final annealing the cold-rolled sheet.

The manufacturing method of the non-oriented steel sheet, after the manufacturing of the hot rolled steel sheet, may further include annealing the hot-rolled steel sheet.

Formula 3 below may be satisfied.

$$[\text{Hot-rolled sheet annealing temperature}(^\circ\text{ C.})]\times[\text{Final annealing temperature }(^\circ\text{ C.})]/[\text{Final annealing time (S)}]\leq 11000 \quad \text{[Formula 3]}$$

The annealing of the hot-rolled sheet may be performed at 900 to 1150° C. for 1 to 5 minutes.

The final annealing may be performed at 900° C. to 1100° C. for 60 to 180 seconds.

According to the embodiment of the present invention, even if a non-oriented electrical steel sheet is processed, magnetism does not deteriorate, and the magnetism is excellent before and after processing.

Therefore, after processing, stress relief annealing (SRA) for magnetism improvement is not required.

MODE FOR INVENTION

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Therefore, a first part, component, area, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above the other part, or another part may be interposed therebetween. In contrast, when referring to a part being "directly above" another part, no other part is interposed therebetween.

Unless otherwise stated, % means wt %, and 1 ppm is 0.0001 wt %.

In embodiments of the present invention, inclusion of an additional element means replacing the balance of iron (Fe) by an additional amount of the additional elements.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

A non-oriented electrical steel sheet according to an embodiment of the present invention includes, in wt %, Si at 0.2 to 4.3%, Mn at 0.05 to 2.5%, Al at 0.1 to 2.1%, Bi at 0.0001 to 0.003%, Ga at 0.0001 to 0.003%, and the balance of Fe and inevitable impurities.

Hereinafter, the reason for limiting the components of the non-oriented electrical steel sheet will be described.

Si at 0.2 to 4.3 wt %

Silicon (Si) is a major element added to reduce eddy current loss of iron loss by increasing specific resistance of steel. When too little Si is added, iron loss is deteriorated. Conversely, when too much Si is added, a magnetic flux density is largely reduced, and a problem may occur in processability. Therefore, Si may be included in the above-mentioned range. Specifically, Si may be contained in an amount of 2.0 to 4.0 wt %. More specifically, Si may be contained in an amount of 2.5 to 3.8 wt %.

Mn at 0.05 to 2.5 wt %

Manganese (Mn) is an element that lowers iron loss by increasing specific resistance along with Si and Al, and that improves a texture. When too little Mn is added, iron loss is deteriorated. Conversely, when too much Mn is added, a magnetic flux density may be largely reduced, and a large amount of precipitate may be formed. Therefore, Mn may be included in the above-mentioned range. Specifically, Mn may be included in an amount of 0.3 to 1.5 wt %.

Al at 0.1 to 2.1 wt %

Aluminum (Al) importantly serves to reduce iron loss by increasing specific resistance along with Si, and also serves to reduce magnetic anisotropy to reduce magnetic deviation in a rolling direction and a transverse direction. When too little Al is added, it is difficult to expect the above-described role. When too much Al is added, a magnetic flux density may be considerably reduced. Therefore, Al may be included in the above-mentioned range. Specifically, Al may be contained in an amount of 0.3 to 1.5 wt %.

Bi at 0.0001 to 0.003 wt %

Bismuth (Bi) is a segregation element and degrades strength of a grain boundary by segregation at the grain boundary, and inhibits a phenomenon that a potential is fixed to the grain boundary. However, when the addition amount thereof is too large, it may inhibit grain growth to deteriorate magnetism. Therefore, Bi may be included in the above-mentioned range. Specifically, Bi may be included in an amount of 0.0003 to 0.003 wt %. More specifically, Bi may be included in an amount of 0.0005 to 0.003 wt %.

Ga at 0.0001 to 0.003 wt %

In addition, gallium (Ga), like Bi, is a segregation element and degrades strength of a grain boundary by segregation at the grain boundary, and inhibits a phenomenon that a potential is fixed to the grain boundary. However, when the addition amount thereof is too large, it may inhibit grain growth to deteriorate magnetism. Therefore, Ga may be included in the above-mentioned range. More specifically, Ga may be included in an amount of 0.0005 to 0.003 wt %.

Bi and Ga may satisfy Formula 2 below.

$$0.002 \le [Bi]+[Ga] \le 0.005 \qquad \text{[Formula 2]}$$

(In Formula 2, [Bi] and [Ga] represent contents (wt %) of Bi and Ga, respectively.)

Bi and Ga are segregation elements and degrade strength of grain boundaries by segregation at the grain boundaries, and inhibit a phenomenon that a potential is fixed to the grain boundaries. Therefore, Bi and Ga may be added in an amount that satisfies Formula 2.

The non-oriented electrical steel sheet according to the embodiment of the present invention may further include one or more of C, S, N, and Ti at 0.005 wt % or less, respectively. As described above, when the additional elements are further contained, they replace the balance of Fe. Specifically, each of C, S, N, and Ti may be further included in an amount of 0.005 wt % or less.

C at 0.005 wt % or less

Carbon (C) is combined with Ti, Nb, etc. to form a carbide to degrade magnetism, and when used after processing from the final product to an electrical product, since iron loss increases due to magnetic aging to decreases efficiency of electrical equipment, an upper limit of an addition amount thereof may be made 0.005 wt %. Specifically, C may be included in an amount of 0.004 wt % or less. More specifically, C may be further included in an amount of 0.001 to 0.003 wt %.

S at 0.005 wt % or less

Sulfur (S) is an element that forms sulfides such as MnS, CuS, and (Cu, Mn)S, which are undesirable to magnetic properties, so it is preferable to add it as low as possible. When S is included in a large amount, magnetism may be deteriorated due to an increase in fine sulfides. Therefore, S may be included in an amount of 0.005 wt % or less. Specifically, S may be further included in an amount of 0.001 to 0.003 wt %.

N at 0.005 wt % or less

Nitrogen (N) is an element that is undesirable to magnetism such as forming a nitride by strongly combining with Al, Ti, Nb, etc. to inhibit crystal grain growth, so it is preferable to include less nitrogen (N). In the embodiment of the present invention, N may be further included in an amount of 0.005 wt % or less. Specifically, N may be further included in an amount of 0.004 wt % or less. More specifically, N may be further included in an amount of 0.001 to 0.003 wt %.

Ti at 0.005 wt % or less

Titanium (Ti) combines with C and N to form fine carbides and nitrides to inhibit crystal grain growth, and as an addition amount of titanium (Ti) is increased, a texture is deteriorated due to the increased carbides and nitrides, so that magnetism is deteriorated. In the embodiment of the present invention, Ti may be further included in an amount of 0.005 wt % or less. Specifically, Ti may be further included in an amount of 0.004 wt % or less. More specifically, Ti may be further included in an amount of 0.001 to 0.003 wt %.

The non-oriented electrical steel sheet according to the embodiment of the present invention may further include one or more of P, Sn, and Sb at 0.1 wt % or less, respectively. Specifically, P, Sn, and Sb may be further included in an amount of 0.1 wt % or less, respectively.

Phosphorus (P), tin (Sn), and antimony (Sb) may be added for further magnetism improvement. However, when addition amounts thereof are too large, since they may inhibit grain growth and degrade productivity, the addition amounts thereof should be controlled so that each addition amount is 0.1 wt % or less. Specifically, one or more of P, Sn, and Sb may be further included in an amount of 0.5 wt % or less, respectively.

The non-oriented electrical steel sheet according to the embodiment of the present invention may further include one or more of Cu, Ni, and Cr at 0.05 wt % or less, respectively.

Copper (Cu), nickel (Ni), and chromium (Cr), which are elements inevitably added in the steel making process, react with impurity elements to form fine sulfides, carbides, and nitrides to undesirably affect magnetism, so each of them is limited to 0.05 wt % or less.

The non-oriented electrical steel sheet according to the embodiment of the present invention may further include one or more of Zr, Mo, and V at 0.01 wt % or less, respectively.

Since zirconium (Zr), molybdenum (Mo), and vanadium (V) are strong carbonitride-forming elements, it is preferable to not be added as much as possible, and each of them should be included in an amount of 0.01 wt % or less.

The balance includes Fe and inevitable impurities. The inevitable impurities are impurities mixed in the steel-making and the manufacturing process of the grain-oriented electrical steel sheet, which are widely known in the field, and thus a detailed description thereof will be omitted. In the embodiment of the present invention, the addition of elements other than the above-described alloy components is not excluded, and various elements may be included within a range that does not hinder the technical concept of the present invention. When the additional elements are further included, they replace the balance of Fe.

As described above, by appropriately controlling the addition amount of Si, Mn, Al, Bi, and Ga, magnetism deterioration during processing may be minimized. Specifically, the embodiment of the present invention may satisfy Formula 1 below.

$$[\text{Iron loss}(W_{15/50})\text{after shearing processing}]-[\text{Iron loss}(W_{15/50})\text{after electric discharge machining}]\leq 0.05(\text{W/kg}) \quad \text{[Formula 1]}$$

The electric discharge machining refers to a process in which a voltage is applied to a wire and a core passes through the wire and then to cut metal along a line. During electric discharge machining, there is substantially no loss of iron due to stress. On the other hand, during shearing (or punching) processing, there is a stress remaining in the steel sheet, thus loss of iron occurs. In the embodiment of the present invention, as Formula 1 is satisfied, iron loss is less deteriorated, and additional stress relief annealing is not required after processing. Specifically, the value of Formula 1 may be 0.01 to 0.05 W/kg. More specifically, the electric discharge machining and shearing mean that a test piece of 30 mm×305 mm is processed, and in particular, the shearing is a case of manufacturing a test piece by shearing with a clearance of 5%. The clearance refers to a value obtained by dividing a gap between an upper mold and a lower mold by a sheet thickness of a material to be processed.

The non-oriented electrical steel sheet according to the embodiment of the present invention is also excellent in basic iron loss. Specifically, the iron loss ($W_{15/50}$) of the non-oriented electrical steel sheet may be 2.3 W/Kg or less. More specifically, the iron loss ($W_{15/50}$) of the non-oriented electrical steel sheet may be 2.1 to 2.3 W/kg. In this case, the iron loss means the iron loss after the shear processing.

A manufacturing method of a non-oriented electrical steel sheet according to an embodiment of the present invention includes: heating a slab; hot-rolling the slab to manufacture a hot-rolled sheet; cold-rolling the hot-rolled sheet to manufacture a cold-rolled sheet; and final annealing the cold-rolled sheet.

First, the slab is heated.

The alloy components of the slab have been described in the alloy components of the above-described non-oriented electrical steel sheet, so duplicate descriptions thereof will be omitted. Since the alloy compositions are not substantially changed during the manufacturing process of the non-oriented electrical steel sheet, the alloy compositions of the non-oriented electrical steel sheet and the slab are substantially the same.

Specifically, the slab includes, in wt %, Si at 0.2 to 4.3%, Mn at 0.05 to 2.5%, Al at 0.1 to 2.1%, Bi at 0.0001 to 0.003%, Ga at 0.0001 to 0.003%, and the balance of Fe and inevitable impurities.

Other additional elements of the slab have been described in the alloy components of the non-oriented electrical steel sheet, so duplicate descriptions thereof will be omitted.

The heating temperature of the slab is not limited, but the slab may be heated at 1250° C. or less. When the slab heating temperature is too high, precipitates such as AlN and MnS present in the slab are re-dissolved and then finely precipitated during hot-rolling and annealing, thereby inhibiting grain growth and reducing magnetism. Specifically, the slab may be heated at 1100 to 1250° C. The heating time may be 10 minutes to 1 hour.

Next, the slab is hot-rolled to manufacture the hot-rolled sheet. A thickness of the hot-rolled sheet may be 2 to 2.3 mm. In the manufacturing of the hot-rolled sheet, a finish rolling temperature may be 800 to 1000° C. The hot-rolled sheet may be wound at temperatures of 700° C. or less.

After the manufacturing of the hot-rolled sheet, hot-rolled-sheet-annealing the hot-rolled sheet may be further included. In this case, a temperature of the hot-rolled-sheet-annealing may be 900 to 1150° C. The annealing time may be 1 to 5 minutes. When the temperature of the hot-rolled-sheet-annealing is too low or the time thereof is too short, the structure does not grow or finely grows, making it difficult to obtain a magnetically beneficial texture during the annealing after the cold rolling. When the temperature of the annealing is too high or the time thereof is too long, the grain may excessively grow and the surface defects of the sheet may become excessive. The hot-rolled sheet annealing is performed in order to increase the orientation favorable to magnetism as required, and it may be omitted. The annealed hot-rolled sheet may be pickled. More specifically, the temperature of the hot-rolled-sheet-annealing may be 950 to 1050° C. The annealing time may be 2 to 4 minutes.

Next, the hot-rolled sheet is cold-rolled to manufacture the cold-rolled sheet. The cold-rolling is finally performed to a thickness of 0.10 mm to 0.70 mm. Specifically, it may be performed to 0.35 to 0.50 mm. As necessary, the second cold-rolling after the first cold-rolling and the intermediate annealing may be performed, and the final rolling reduction may be in a range of 50 to 95%.

Next, the cold-rolled sheet is finally annealed. In the process of annealing the cold-rolled sheet, the annealing temperature is not largely limited as long as it is a temperature generally applied to the non-oriented electrical steel sheet. Since the iron loss of the non-oriented electrical steel sheet is closely related to the grain size, it is suitable when it is 900 to 1100° C. The annealing time may be 60 to 180 seconds. When the temperature thereof is too low or the time thereof is too short, the grain is too fine, and thus the hysteresis loss increases, while when the temperature thereof is too high or the time thereof is too long, the grain is too coarse, and thus the eddy current loss increases, and the iron loss may be deteriorated. Specifically, the annealing may be performed for 90 to 130 seconds at 930 to 1050° C.

The hot-rolled-sheet-annealing and the final annealing may satisfy Formula 3 below.

[Hot-rolled sheet annealing temperature(° C.)]×[Final annealing temperature (° C.)]/[Final annealing time(S)]≤11000 [Formula 3]

In order to obtain excellent iron loss after the processing, the annealing temperature of the hot-rolled sheet and the temperature of the final annealing related to the precipitates of the final annealed sheet are important, and they may be adjusted to satisfy Formula 3 described above. When the density of fine precipitates of the final annealed sheet is high, dislocations are pinned during the processing accordingly and the residual stresses increase, so that the grain size of the final annealed sheet satisfies optimum magnetism while the precipitates must be sufficiently coarse. Here, as the annealing temperature of the hot-rolled sheet is lower, the formation of the fine precipitates may be inhibited to form an electrical steel sheet having a small residual stress after processing. In addition, the lower the final annealing temperature is, the more advantageous, but when the final annealing temperature is low, the grain size for optimal iron loss may not be secured. Further, when the hot-rolled sheet annealing temperature is too high, the grain size growth is slow due to the precipitates formed in the hot-rolled sheet annealing process. Therefore, it is important to secure the grain size by increasing the annealing time at a low hot-rolled sheet temperature and at a low temperature during the final annealing. The hot-rolled sheet annealing temperature and the final annealing temperature in Formula 1 mean the soaking temperature. Specifically, the value of Formula 3 may be 7500 to 11,000.

After the final annealing, the steel sheet may have an average grain diameter of 80 to 170 μm. In this case, the diameter means, by assuming an imaginary circle with the same area as the grain, a diameter of the circle. The diameter may be measured based on a cross-section parallel to a rolled surface (ND surface).

After the final annealing, an insulating film may be formed. The insulating film may be formed as an organic, inorganic, and organic/inorganic composite film, and it may be formed with other insulating coating materials.

Hereinafter, the present invention will be described in more detail through examples. However, the examples are only for illustrating the present invention, and the present invention is not limited thereto.

EXAMPLES

A slab including the alloy compositions and the balance of Fe and inevitable impurities summarized in Table 1 below were prepared. The slab was heated to 1150° C. Next, it was hot-rolled to a thickness of 2.3 mm and wound at 650° C. The hot-rolled steel sheet cooled in air was annealed for 3 minutes at the temperatures listed in Table 2 below, pickled, and then cold-rolled to a thickness of 0.5 mm. Next, the cold-rolled sheet was finally annealed at the temperature and time summarized in Table 2 below.

From an L direction and a C direction of the manufactured steel sheet, an Epstein test piece of 30 mm (length)×305 mm (width) for magnetism measurement was collected by a shear process set to a clearance of 5%. In order to measure iron loss of a specimen without an effect of processing, the sheet processing was used as electric discharge processing, and through this, it was used as a measure to evaluate iron loss deterioration due to the shearing or punching processing. For the specimen, all iron losses ($W_{15/50}$) were measured by the Epstein test. The Iron loss ($W_{15/50}$) is average loss (W/kg) of the rolling direction and the transverse direction when the magnetic flux density of 1.5 Tesla is induced at a frequency of 50 Hz. In this case, the iron loss is iron loss after the shear processing.

TABLE 1

| Example | Si | Mn | Al | P | S | N | C | Ti | Bi | Ga |
|---|---|---|---|---|---|---|---|---|---|---|
| Comparative Material 1 | 3.155 | 0.0921 | 0.082 | 0.0388 | 0.0018 | 0.0016 | 0.0018 | 0.0015 | 0 | 0 |
| Comparative Material 2 | 3.31 | 0.445 | 0.051 | 0.0094 | 0.0017 | 0.0013 | 0.0027 | 0.0012 | 0.0017 | 0 |
| Comparative Material 3 | 3.144 | 0.25 | 0.155 | 0.0107 | 0.0015 | 0.0016 | 0.0025 | 0.0009 | 0 | 0.001 |
| Inventive Material 1 | 3.335 | 0.923 | 0.465 | 0.034 | 0.0026 | 0.0019 | 0.0021 | 0.001 | 0.0008 | 0.0021 |
| Inventive Material 2 | 3.214 | 0.917 | 0.504 | 0.0483 | 0.0013 | 0.0015 | 0.003 | 0.0017 | 0.0029 | 0.0011 |
| Inventive Material 3 | 3.157 | 0.627 | 0.616 | 0.0122 | 0.0019 | 0.0017 | 0.0026 | 0.0015 | 0.0014 | 0.0016 |
| Inventive Material 4 | 3.201 | 0.714 | 0.604 | 0.009 | 0.0018 | 0.0014 | 0.0024 | 0.002 | 0.0021 | 0.0009 |
| Inventive Material 5 | 3.057 | 0.427 | 0.674 | 0.0081 | 0.0019 | 0.0017 | 0.0026 | 0.0015 | 0.0004 | 0.0023 |
| Inventive Material 6 | 2.952 | 0.394 | 0.355 | 0.0075 | 0.002 | 0.0018 | 0.002 | 0.0019 | 0.0006 | 0.0027 |

TABLE 2

| Example | Hot-rolled sheet annealing temperature (° C.) | Final annealing temperature (° C.) | Final annealing time (s) | [Formula 3] | Iron loss W15/50 (W/kg) | [Formula 1] (W/kg) |
|---|---|---|---|---|---|---|
| Comparative Material 1 | 1,020 | 1,070 | 75 | 14,552 | 2.38 | 0.14 |
| Comparative Material 2 | 1,080 | 1,030 | 86 | 12,935 | 2.34 | 0.09 |
| Comparative Material 3 | 1,080 | 1,020 | 92 | 11,974 | 2.31 | 0.07 |
| Inventive Material 1 | 980 | 1,020 | 92 | 10,865 | 2.3 | 0.05 |
| Inventive Material 2 | 980 | 1,010 | 100 | 9,898 | 2.29 | 0.04 |
| Inventive Material 3 | 980 | 1,010 | 109 | 9,081 | 2.29 | 0.04 |
| Inventive Material 4 | 1,080 | 990 | 120 | 8,910 | 2.28 | 0.03 |
| Inventive Material 5 | 980 | 980 | 120 | 8,003 | 2.27 | 0.02 |
| Inventive Material 6 | 1,000 | 950 | 120 | 7,917 | 2.24 | 0.01 |

As shown in Table 1 and Table 2, it can be confirmed that, in the inventive materials including both Bi and Ga, the difference between the iron loss after the shear processing and the iron loss after the electric discharge processing is not large. In addition, it can be confirmed that the iron loss thereof is excellent.

On the other hand, it can be confirmed that the comparative materials that do not include Bi or Ga have a large difference between the iron loss after the shear processing and the iron loss after the electric discharge processing, and the iron losses thereof are relatively deteriorated.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

The invention claimed is:

1. A non-oriented electrical steel sheet including, in wt %, Si at 0.2% to 4.3%, Mn at 0.05% to 2.5%, Al at 0.1% to 2.1%, Bi at 0.0003% to 0.003%, Ga at 0.0005% to 0.003%, and a balance of Fe and inevitable impurities, wherein the non-oriented electrical steel sheet satisfies Formula 2:

$$-0.002 \leq [Bi]+[Ga] \leq 0.005, \quad \text{[Formula 2]}$$

wherein in Formula 2, [Bi] and [Ga] represent content by wt % of Bi and Ga, respectively.

2. The non-oriented electrical steel sheet of claim 1, wherein the non-oriented electrical steel sheet satisfies Formula 1:

$$\text{[Iron loss } (W_{15/50}) \text{ after shearing processing]} - \text{[Iron loss } (W_{15/50}) \text{ after discharge processing]} \leq 0.05 \text{ (W/kg)}. \quad \text{[Formula 1]}$$

3. The non-oriented electrical steel sheet of claim 1, wherein one or more of C, S, N, and Ti are further included in an amount of 0.005 wt % or less, respectively.

4. The non-oriented electrical steel sheet of claim 1, wherein one or more of P, Sn, and Sb are further included in an amount of 0.2 wt % or less, respectively.

5. The non-oriented electrical steel sheet of claim 1, wherein one or more of Cu, Ni, and Cr are further contained in an amount of 0.05 wt % or less, respectively.

6. The non-oriented electrical steel sheet of claim 1, wherein one or more of Zr, Mo, and V are further contained in an amount of 0.01 wt % or less, respectively.

* * * * *